United States Patent [19]

Taniguchi et al.

[11] Patent Number: 5,280,469
[45] Date of Patent: Jan. 18, 1994

[54] SYSTEM FOR MONITORING NORMALITY OF OPERATION OF ATM CROSS-CONNECTING APPARATUS

[75] Inventors: Ikuo Taniguchi; Kenji Narita; Kenichi Hashimoto, all of Kawasaki, Japan

[73] Assignees: Fujitsu Limited; Nippon Telegraph and Telephone Public Corporation, Japan

[21] Appl. No.: 900,957

[22] Filed: Jun. 18, 1992

[30] Foreign Application Priority Data

Jun. 18, 1991 [JP] Japan .................. 3-146109

[51] Int. Cl.⁵ ........................... H04L 12/56
[52] U.S. Cl. ........................... 370/13; 370/60
[58] Field of Search ............. 370/13, 14, 17, 58.1, 370/60.1; 371/20.4, 24, 27; 379/10, 11, 15, 16

[56] References Cited

U.S. PATENT DOCUMENTS

| 4,302,836 | 11/1981 | d'Ivoire et al. | 370/14 |
| 4,947,388 | 8/1990 | Kuwahara et al. | 370/60 |
| 5,142,653 | 8/1992 | Schefts | 379/16 |

FOREIGN PATENT DOCUMENTS

| 0418813 | 3/1991 | European Pat. Off. |
| 0422717 | 4/1991 | European Pat. Off. |
| 0484943 | 5/1992 | European Pat. Off. |
| 2-239749 | 9/1990 | Japan |
| 3-262354 | 11/1992 | Japan |

Primary Examiner—Benedict V. Safourek
Attorney, Agent, or Firm—Welsh & Katz, Ltd.

[57] ABSTRACT

A system for monitoring an ATM cross-connecting apparatus by rewriting a VPI conversion table to various values, inputting a test cell, and examining the test cell after the test cell passes through the ATM cross-connecting apparatus. Entries of a VPI conversion table are accompanied by traffic flags indicating whether or not the corresponding entry is occupied for use for user's signals. First, the traffic flags are examined. Each entry not occupied for user's signals can be freely rewritten. Each entry occupied for user's signals is not rewritten. The examination of the test cell is carried out by comparing the test cell output from the ATM cross-connecting apparatus, with a reference cell which is expected from a normal operation of the ATM cross-connecting apparatus. The virtual path identifier converted in the ATM cross-connecting apparatus and contained in the output test cell, is expected corresponding to the above rewriting operations, and is contained in the reference cell.

8 Claims, 14 Drawing Sheets

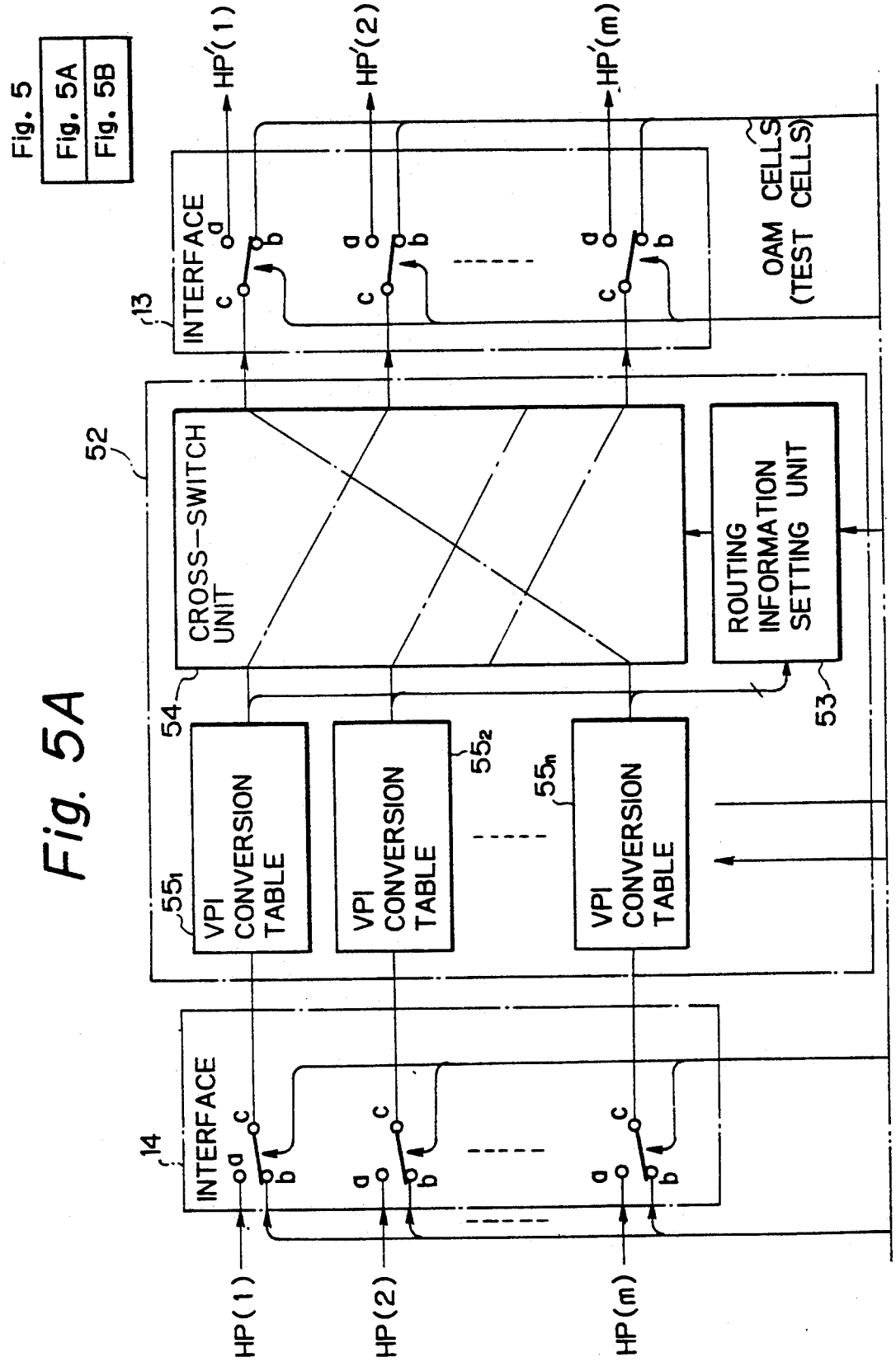

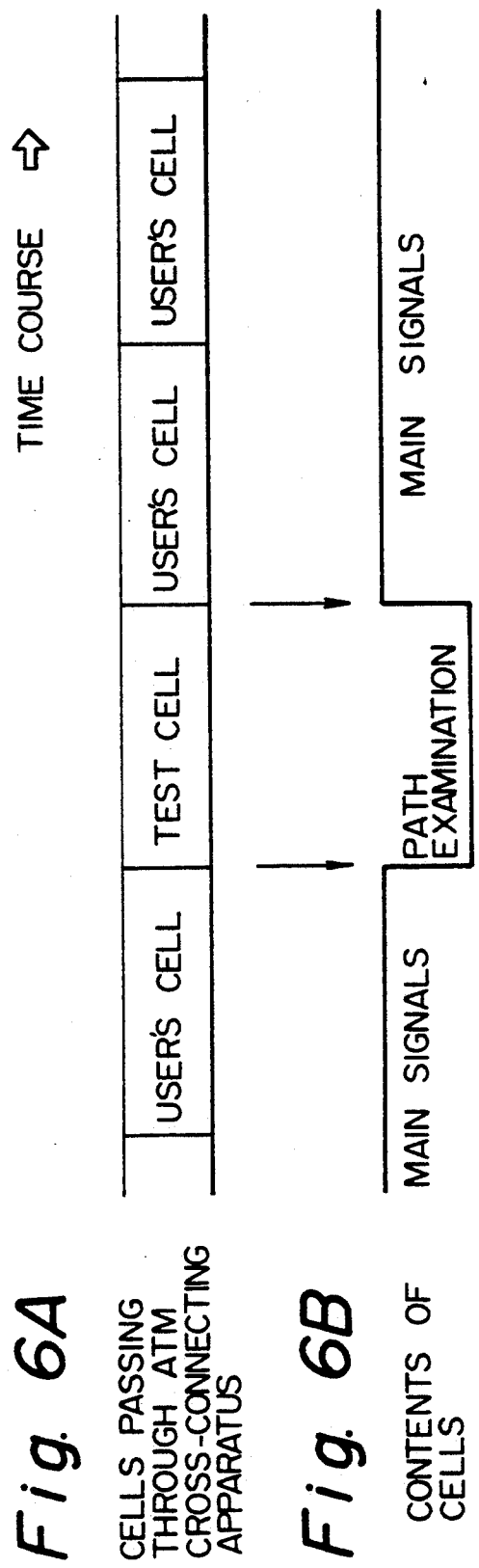

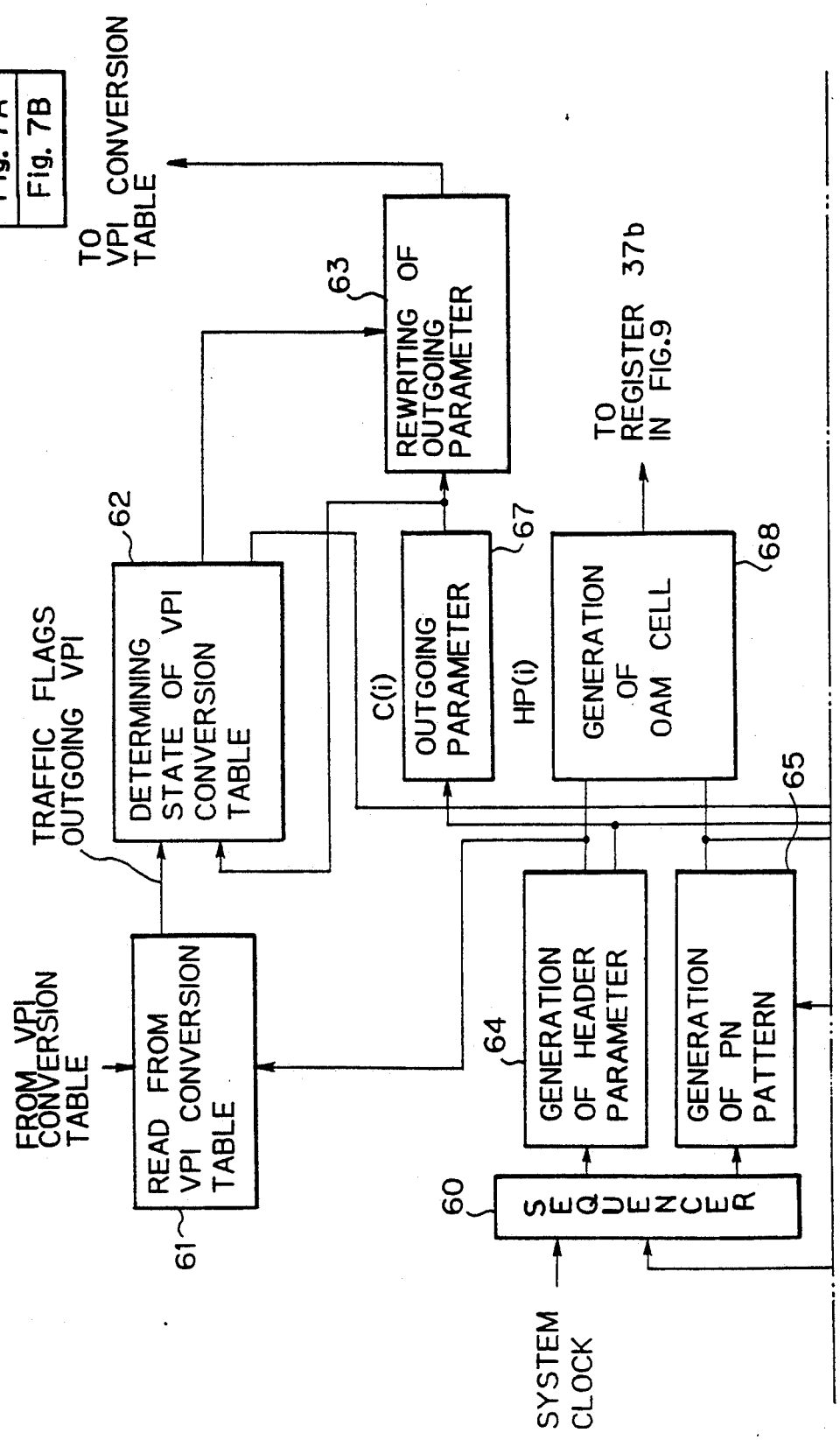

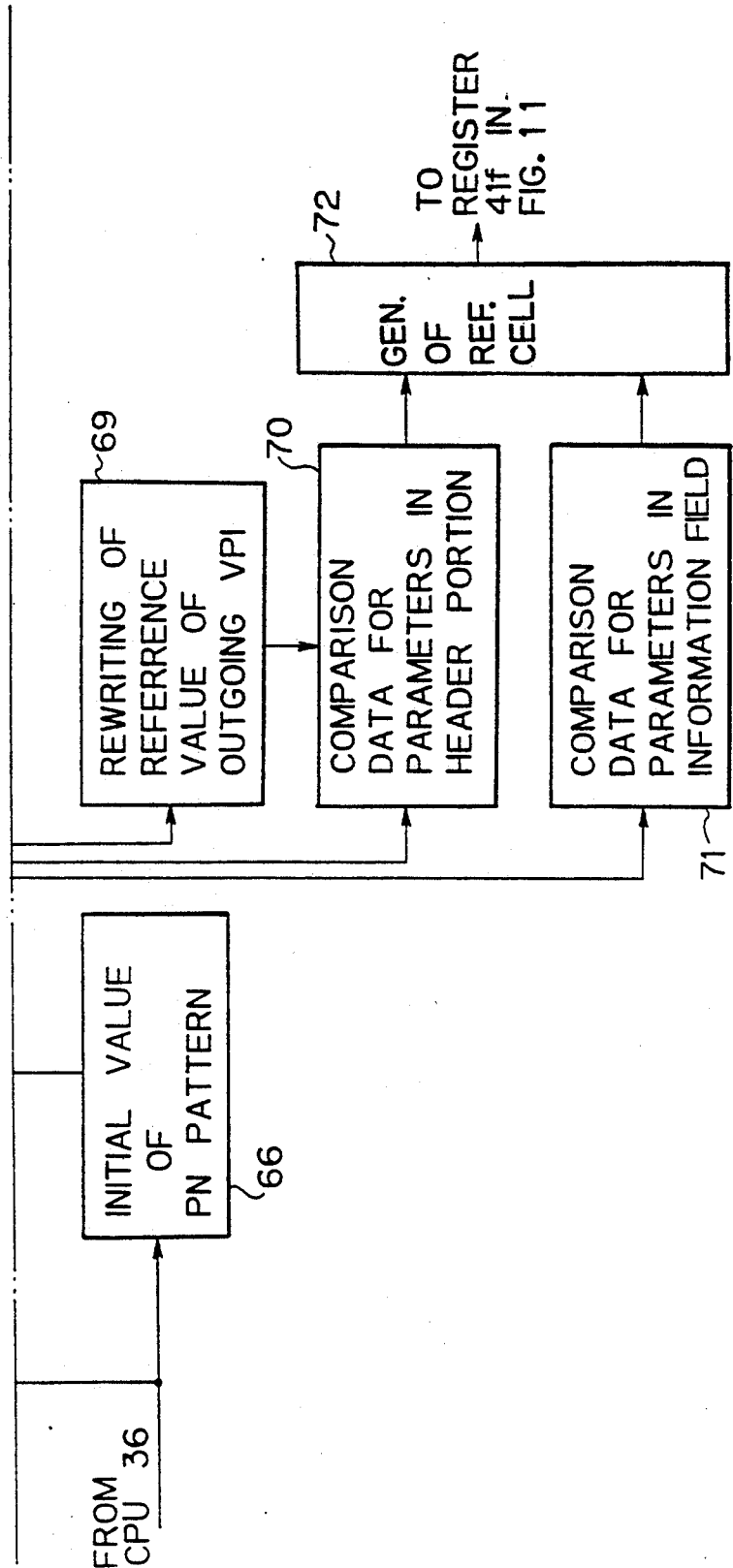

SYSTEM FOR MONITORING NORMALITY OF OPERATION OF ATM CROSS-CONNECTING APPARATUS

BACKGROUND OF THE INVENTION

Field of the Invention

The present invention relates to a system for monitoring an operation of an ATM (Asynchronous Transmission Mode) cross-connecting apparatus, and an ATM cross-connecting apparatus having a function of monitoring the operation of itself.

In an ATM communication network, information contained in a cell is transmitted through an ATM cross-connecting apparatus provided in each node of the ATM communication network. Each ATM cell contains a virtual path identifier (VPI) assigned to each virtual path, where, generally, a plurality of virtual paths can be set in each link established between each two adjacent nodes in the network, and the virtual path identifier (VPI) is assigned to recognize each virtual path in each link. When an ATM cross-connecting apparatus inputs an ATM cell from one of a plurality of input ports thereof, the ATM cross-connecting apparatus converts (rewrites) a virtual path identifier in the ATM cell in accordance with a VPI conversion table provided in the ATM cross-connecting apparatus, and then the ATM cell is switched to an output port to be output therefrom, corresponding to the input port from which the ATM cell has come in, where the output port is determined in accordance with a routing table provided in the ATM cross-connecting apparatus. It is necessary to examine the normality of the functions of converting the virtual path identifier and switching the route of the ATM cell. The present invention relates to a system for monitoring the normality of the operations of the ATM cross-connecting apparatus, in particular, to a system for monitoring the normality of the VPI conversion table in the ATM cross-connecting apparatus.

The monitoring of the ATM cross-connecting apparatus is carried out by generating and inputting an OAM (Operation, Administration, and Management) cell, and monitoring the content of the ATM cell output from the ATM cross-connecting apparatus. FIG. 1 is a diagram illustrating a format of an OAM cell which is used for monitoring the operation of the ATM cross-connecting apparatus. In the example of FIG. 1, the ATM cross-connecting apparatus to be monitored is assumed to contain a switch unit of a capacity of 2.4 Gbps, for cross-connecting a plurality of input ports with a plurality of output ports, a plurality of input-side and output-side interface units, a plurality of first-stage multiplexers/demultiplexers of a capacity of 600 Mbps, and a second-stage multiplexer/demultiplexer of a capacity of 2.4 Gbps. The first and second-stage multiplexers/demultiplexers are provided between the switch unit and the plurality of input and output ports. The OAM cell in FIG. 4 contains a header portion of six bytes and an information field of 48 bytes. The two bytes from the top in the header portion are added in the ATM cross-connecting apparatus when the OAM cell is input therein, and the remaining 52 bytes correspond to the format of the usual ATM cells transmitted on transmission lines except that the HEC portion is deleted therefrom. In the format of FIG. 1, "OAM" denotes a two-bit identifier area which indicates that this ATM cell is an OAM cell, P1 denotes a two-bit area for identifying an output port from which a currently flowing ATM cell is to be output in each first-stage multiplexer/demultiplexer of 600 Mbps, P2 denotes a two-bit area for identifying an output port from which a currently flowing ATM cell in the second-stage multiplexer/demultiplexer of 2.4 Gbps, P3 denotes a four-bit area for identifying an output port from which an ATM cell currently flowing in the switch unit of 2.4 Gbps, is input thereto, and the other areas correspond to the well-known areas defined by the CCITT recommendation. For example, "VPI" denotes the above-mentioned virtual path identifier, "VCI" denotes a virtual channel identifier, "PT" denotes a payload type, "R" denotes a reserve field, and "C" denotes a cell loss priority. In the information field in the OAM cell used for monitoring the operation of the ATM cross-connecting apparatus, a PN pattern generated from a generator polynomial, for example, $X^{11}+X^2+1$. In the above switch unit, the cross-connecting is performed in accordance with the information in the area P3. In each of the above first-stage and second-stage multiplexers/demultiplexers, an output port from which each ATM cell is to be output is determined based on the contents in the above areas P1 and P2, respectively.

FIG. 2 is a diagram illustrating a sequence of monitoring the normality of an ATM cross-connecting apparatus by inputting an OAM cell for monitoring the operation of the ATM cross-connecting apparatus. Generally, a plurality of OAM cells for the monitoring are generated and input into the ATM cross-connecting apparatus through the plurality of input ports. Each OAM cell of the format of FIG. 1 is generated at an OAM cell generating point #i corresponding to each input port (i=1 to n, and n is the number of the input ports of the ATM cross-connecting apparatus) at a timing provided from a sequencer 101 to input the ATM cell into the ATM cross-connecting apparatus through a corresponding (i-th) input port. In addition to the above construction, a plurality of VPI conversion units each containing a VPI conversion table, are provided corresponding to the plurality of input ports. Further, a routing table is provided for setting therein information for determining the connection between the plurality of input ports and the plurality of output ports in the switch unit. Each VPI conversion unit converts a virtual path identifier contained in an ATM cell which is input from a corresponding input port, to another virtual path identifier for identifying a virtual path in the outgoing direction, through which the ATM cell is to be transmitted. For each of the plurality of input ports, one VPI conversion table as mentioned above is provided. Before the above input of the ATM cell, the contents of the VPI conversion tables and the routing table in the ATM cross-connecting apparatus are rewritten at a timing provided from a sequencer 111 in the ATM cross-connecting apparatus. When an ATM cell is input, the ATM cross-connecting apparatus rewrites the content of the area VPI for the virtual path identifier in accordance with the above-rewritten VPI conversion table, and outputs the ATM cell from an output port which is determined based on the above-rewritten routing table. At the OAM cell detecting point #j (j=1 to n) corresponding to each output port, the normality of the ATM cross-connecting apparatus is examined by determining whether or not the above content of the OAM cell output from the output port of the ATM cross-connecting apparatus as above coincides with the content of the OAM cell which is expected to be output from the output port when the ATM cross-connecting apparatus normally operates.

However, conventionally, as indicated in FIG. 3, the monitoring of the normality of the ATM cross-connecting apparatus is carried out for portions of each VPI conversion table which are not used for the conversion of the virtual path identifiers in ATM cells of the main signals (users' signals). Therefore, conventionally, other portions of each VPI conversion table which are used for the conversion of the virtual path identifiers when cross-connecting ATM cells of the main signals (users' signals), cannot be examined regarding their normality.

SUMMARY OF THE INVENTION

An object of the present invention is to provide a system for monitoring the normality of an ATM cross-connecting apparatus, whereby the portions of a VPI conversion table which are used for the conversion of virtual path identifiers in ATM cells of main signals (users' signals), can be examined regarding their normality.

According to the present invention, there is provided a system for monitoring an ATM cross-connecting apparatus connecting a plurality of incoming paths and a plurality of outgoing paths, and inputting a plurality of ATM cells from the plurality of incoming paths. The ATM cross-connecting apparatus comprises: a plurality of input ports respectively connected to the plurality of incoming paths; a plurality of output ports respectively connected to the plurality of outgoing paths; a switch unit for connecting the plurality of incoming paths and the plurality of outgoing paths in accordance with routing information; a VPI conversion unit, provided for and connected to each input port, for converting a first virtual path identifier contained in the ATM cell, to a second virtual path identifier for identifying a virtual path in the outgoing path through which the ATM cell is to be transmitted; a VPI conversion table, contained in each VPI conversion unit, for having entries containing values of the second virtual path identifier corresponding to all possible values of the first virtual path identifier; and a traffic flag unit, provided corresponding to the entries in the VPI conversion table, for containing flag information whether or not each entry currently contains a value of the second virtual path identifier which is used for transmission of an ATM cell containing a user's signal. The self-testing unit comprises: a first virtual path identifier generating unit for generating a value of the first virtual path identifier for being contained in a test cell to be input from each of the plurality of input ports of the ATM cross-connecting apparatus; a second virtual path identifier generating unit for generating a value of the second virtual path identifier corresponding to the value of the first virtual path identifier generated by the first virtual path identifier generating unit; a state-of-table determining unit for reading the value of the second virtual path identifier contained in the VPI conversion table, corresponding to the value of the first virtual path identifier, and the flag information corresponding to the value of the first virtual path identifier, and determining whether or not the flag information indicates that the entry currently contains a value of the second virtual path identifier used for transmission of an ATM cell containing a user's signal, and determining whether or not the value of the second virtual path identifier read from the VPI conversion table coincides with the value of the second virtual path identifier generated by the second virtual path identifier generating unit; a second virtual path identifier rewriting unit for rewriting the value of the second virtual path identifier corresponding to the value of the first virtual path identifier, in the VPI conversion table when the flag information corresponding to the value of the first virtual path identifier does not indicate that the entry currently contains a value of the second virtual path identifier used for transmission of an ATM cell containing a user's signal; a reference VPI selecting unit for selecting as a reference value, the value of the second virtual path identifier read from the VPI conversion table, when the flag information corresponding to the value of the first virtual path identifier indicates that the entry currently contains a value of the second virtual path identifier used for transmission of an ATM cell containing a user's signal, and the value of the second virtual path identifier read from the VPI conversion table does not coincide with the value of the second virtual path identifier generated by the second virtual path identifier generating unit; and the reference VPI selecting unit for selecting as the reference value, the value of the second virtual path identifier generated by the second virtual path identifier generating unit, when the flag information corresponding to the value of the first virtual path identifier indicates that the entry currently does not contain a value of the second virtual path identifier used for the transmission of an ATM cell containing a user's signal, or the value of the second virtual path identifier read from the VPI conversion table coincides with the value of the second virtual path identifier generated by the second virtual path identifier generating unit; a test cell input unit for generating and inputting the test cell containing the value of the first virtual path identifier generated by the first virtual path identifier generating unit, for each of the plurality of input ports, to input the test cell into the input port; and a comparing unit for comparing the value of the second virtual path identifier contained in the test cell passed through the ATM cross-connecting apparatus, with the value of the second virtual path identifier generated by the second virtual path identifier generating unit.

The above system may be contained in the ATM cross-connecting apparatus.

BRIEF DESCRIPTION OF THE DRAWINGS

In the drawings:

FIGS. 5, 5A and 5B are diagrams illustrating the overall construction of an embodiment of the ATM cross-connecting apparatus according to the present invention;

FIGS. 6A and 6B are diagrams illustrating an example timing of an OAM cell input into the cross-connecting unit 52 at a timing between ATM cells of users' signals;

FIGS. 7, 7A and 7B are a diagram illustrating a detailed construction of the parameter generating unit 43 in the construction of FIGS. 5A and 5B;

FIGS. 12, 12A and 12B are diagram illustrating an overall sequence of monitoring the ATM cross-connecting apparatus according to the present invention.

DESCRIPTION OF THE PREFERRED EMBODIMENTS

Figure 4:
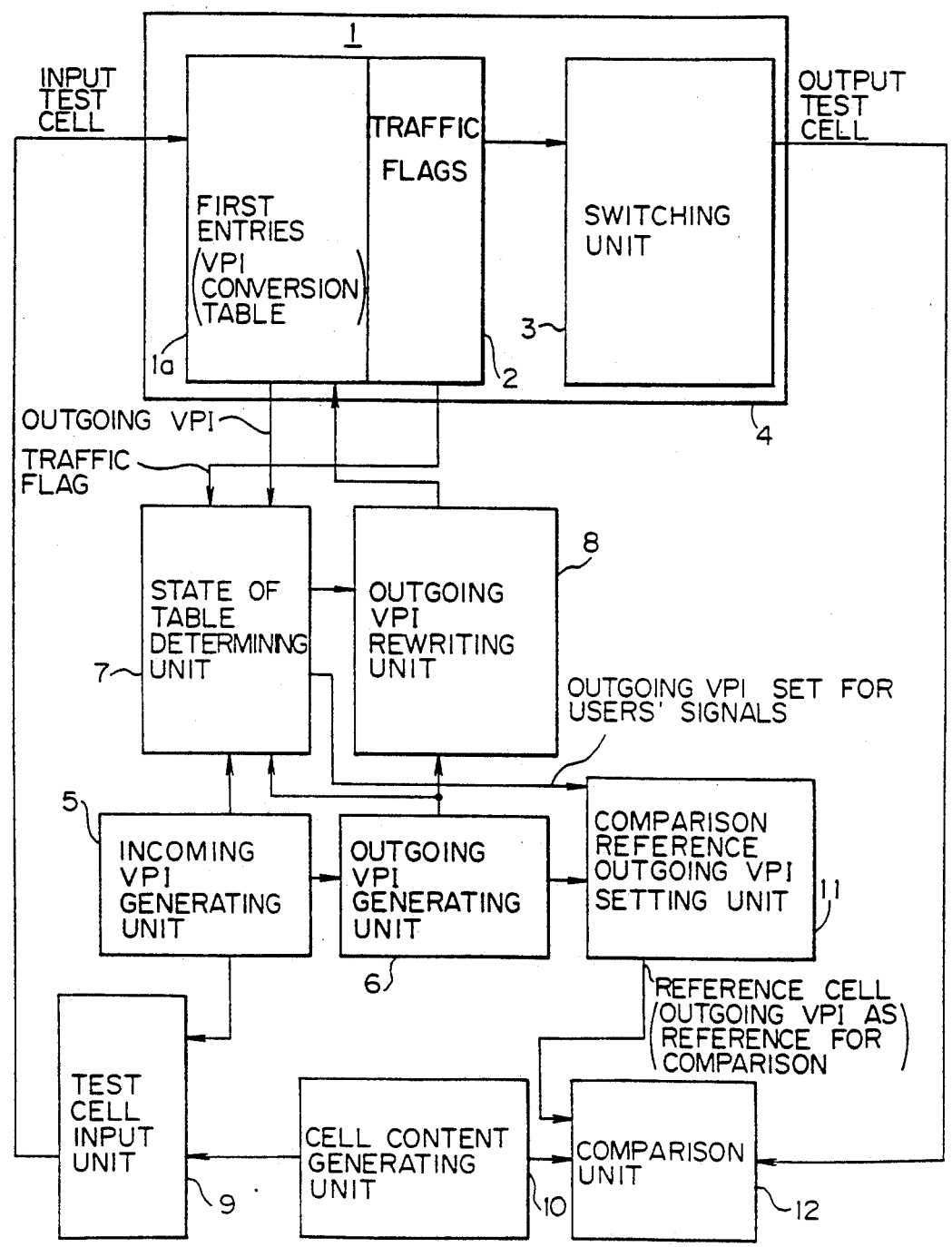
FIG. 4 is a diagram illustrating the basic construction of the present invention.

Basic Principle of the Present Invention (FIG. 4)

FIG. 4 is a diagram illustrating the basic construction of the present invention. In FIG. 4, reference numeral 1 denotes a VPI conversion unit, 1a denotes a VPI conversion table, 2 denotes entries for traffic flags, 3 denotes a switching unit, 4 denotes a cross-connecting unit, 5 denotes an incoming VPI generating unit, 6 denotes an outgoing VPI generating unit, 7 denotes a state-of-table entry determining unit, 8 denotes an outgoing VPI rewriting unit, 9 denotes a test cell input unit, 10 denotes a cell content generating unit, 11 denotes a reference VPI generating unit, and 12 denotes a comparison unit.

The ATM cross-connecting apparatus of FIG. 4 contains the cross-connecting unit 4 containing a plurality of input ports corresponding to a plurality of incoming path directions and a plurality of output ports corresponding to a plurality of outgoing path directions, and a self-testing unit for monitoring the operation of the cross-connecting unit 4. The cross-connecting unit 4 contains a plurality of VPI conversion units 1 (although only one VPI conversion table is indicated in FIG. 4) corresponding to the plurality of input ports. Each VPI conversion unit 1 contains the VPI conversion table 1a which holds information for being used for converting a virtual path identifier contained in an ATM cell which is input from a corresponding input port, to another virtual path identifier for identifying a virtual path in the corresponding outgoing direction, through which the ATM cell is to be transmitted. Hereinafter, the virtual path identifier contained in an ATM cell which is input from a corresponding input port is referred to as "incoming VPI", and the virtual path identifier for identifying a virtual path in the outgoing direction, through which the ATM cell is to be transmitted, is referred to as "outgoing VPI". Referring to the VPI conversion table 4, each VPI conversion unit 1 converts an incoming VPI to an outgoing VPI. The path direction switching unit 3 switches the connections between the incoming path directions of the ATM cells which are input into the ATM cross-connecting apparatus, and corresponding outgoing path directions.

According to the present invention, each VPI conversion table 1 contains a plurality of first entries and a plurality of second entries corresponding to the plurality of first entries, respectively. The plurality of first entries (and the plurality of second entries) are provided corresponding to a plurality of possible values of the incoming VPI, and each first entry contains an outgoing VPI to which the incoming VPI corresponding to the first entry is to be converted. The second entries 2 contain traffic flags corresponding to the respective first entries. Each traffic flag is provided for indicating whether or not an outgoing VPI is written in the corresponding first entry, i.e., whether or not the first entry corresponding to the traffic flag is used for transmitting ATM cells containing users signals.

The above self-testing unit contains the incoming VPI generating unit 5, the outgoing VPI generating unit 6, the state-of-table entry determining unit 7, the outgoing VPI rewriting unit 8, the reference VPI generating unit 11, cell content generating unit 10, and the comparison unit 12.

The incoming VPI generating unit 5 generates an incoming VPI which designates one of the first entries for each of the VPI conversion tables 1a, to examine or access the first entry.

The outgoing VPI generating unit 6 generates an outgoing VPI corresponding to the above incoming VPI generated by the incoming VPI generating unit 5 for each VPI conversion table 1a. The outgoing VPI generating unit 6 generates an outgoing VPI to which the above incoming VPI generated in the incoming VPI generating unit 5 is to be converted in the VPI conversion table 1a when the corresponding outgoing VPI is written in the first entry corresponding to the incoming VPI, in the VPI conversion table.

The state-of-table entry determining unit 7 reads out the outgoing VPI and the corresponding traffic flag from the first and second entries corresponding to the above incoming VPI to be accessed in the VPI conversion table 1. Then, the state-of-table entry determining unit 7 determines whether or not each of the traffic flags is valid, and whether or not the outgoing VPI read out from the VPI conversion table 1 as above, coincides with the outgoing VPI generated by the outgoing VPI generating unit 6 corresponding to the same incoming VPI as the traffic flag, for the corresponding VPI conversion table 1.

When the above traffic flag is not valid, the outgoing VPI rewriting unit 8 rewrites the corresponding first entry of the VPI conversion table 1, with the outgoing VPI generated by the outgoing VPI rewriting unit 8.

When the above traffic flag is valid, and the outgoing VPI read out from the VPI conversion table 1, does not coincide with the outgoing VPI generated by the outgoing VPI generating unit 6, the comparison reference outgoing VPI setting unit 11 sets as a reference value for comparison, the outgoing VPI read out from the VPI conversion table 1. When the above traffic flag is not valid, or when the outgoing VPI read out from the VPI conversion table 1, coincides with the outgoing VPI generated by the outgoing VPI generating unit 6, the comparison reference outgoing VPI setting unit 11 sets as a reference value for comparison, the outgoing VPI generated by the outgoing VPI generating unit 6.

The cell content generating unit 10 generates the content of a test cell other than the virtual path identifier.

The test cell input unit 9 generates a test cell containing the incoming VPI to be examined, and the above content generated by the cell content generating unit 10, for each of the plurality of input ports, to input the test cell into the cross-connecting unit 4 through the input port.

The comparison unit 12 compares the content of the test cell which passed through the cross-connecting unit, with the above content generated by the cell content generating unit 10, and the above reference value for comparison set by the reference VPI generating unit 11.

In the above construction, the above operations by the state-of-table entry determining unit 7, the outgoing VPI rewriting unit 8, and the comparison reference outgoing VPI setting unit 11, are carried out for all of the first entries of all the VPI conversion tables.

According to the present invention, all the (first) entries of the VPI conversion table 1 can be examined within a limiting condition that the virtual path identifiers in the VPI conversion table 1, which is used for the transmission of ATM cells containing the users' signals, are not changed. Namely, for the first entries which are not used for the transmission of ATM cells containing the users' signals, the normality of the operations of converting from all possible values of the incoming VPI to all possible values of the outgoing VPI can be examined.

In addition to the above construction, the above path direction switching unit 3 can contain a routing information information unit 53 for holding the routing information, and the above system may further contain, a routing information control unit 39 for setting the content held by the routing information holding unit 53, and an output selecting unit for selecting one of outputs from the plurality of output ports of the cross-connecting unit 4 corresponding to the change of the routing information, to obtain the test cell to be compared by the comparing unit 12.

Otherwise, the test cell input unit 9 may generate a plurality of test cells for the plurality of input ports, to input the test cells through the plurality of input ports to the cross-connecting unit 4 in each examination cycle; and the reference VPI selecting unit 11 generating a plurality of reference values of the second virtual path identifier to be compared with a plurality of test cells output from the plurality of output ports of the cross-connecting unit 4 in each examination cycle. In addition, the self-testing unit may comprise a routing information control unit 39 for changing the content held by the routing information holding unit 53, and an output order rearranging unit for rearranging the order of the plurality of reference values corresponding to the routing information held in the routing information holding unit 53, so that the order of the plurality of reference values coincides with the order of the plurality of outputs from the plurality of output ports of the cross-connecting unit 4.

Further, the self-testing unit may further comprise a test cell information generating unit 10 for generating information to be contained in the test cell other than the first virtual path identifier. The test cell generated by the test cell input unit 9 further contains the information generated by the test cell information generating unit 10. In addition, the comparing unit 12 may further compare the content of the test cell output from the cross-connecting unit 4, other than the value of the second virtual path identifier contained in the test cell, with the information generated by the test cell information generating unit 10.

Embodiment (FIGS. 5 to 12)

Figure 5B:
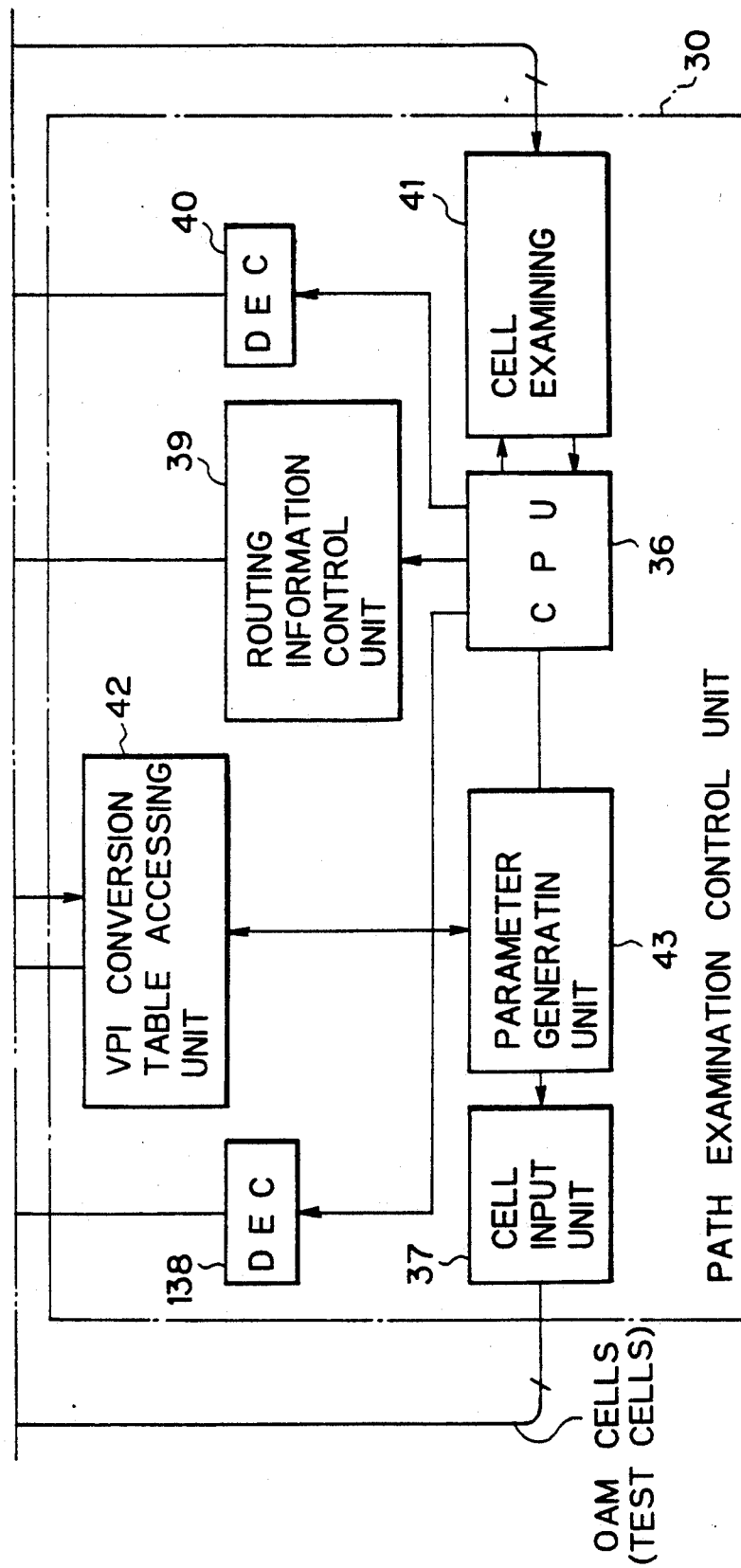

FIGS. 5A and 5B are diagrams illustrating the overall construction of an embodiment of the ATM cross-connecting apparatus according to the present invention. In FIGS. 5A and 5B, reference numeral 14 denotes an input-side interface unit, 13 denotes an output-side interface unit, 30 denotes a path examination control unit, and 52 denotes a cross-connecting unit.

The cross-connecting unit 52 contains a plurality of input ports, a plurality of output ports, a plurality of VPI conversion units $55_1, \ldots 55_n$, a routing information setting unit 53, and a cross-switch unit 54. The VPI conversion units $55_1, \ldots 55_n$ are respectively connected to the plurality of input ports, and each of the VPI conversion units $55_1, \ldots 55_n$ converts an incoming VPI in an ATM cell input from the input port connected thereto, to an outgoing VPI in accordance with routing information held in the routing information setting unit 53. The routing information setting unit 53 holds information through which output port ATM cells input from the respective input ports are to be output. The cross-switch unit 54 has a plurality of input terminals and a plurality of output terminals corresponding to the plurality of input ports and the plurality of output ports of the cross-connecting unit 52, the plurality of input terminals of the cross-switch unit 54 are connected to output terminals of the corresponding VPI conversion units $55_1, \ldots 55_n$, and the plurality of output terminals are connected to the plurality of output ports of the cross-connecting unit 52. The cross-switch unit 54 cross-connects the plurality of input terminals with the plurality of output terminals in accordance with the information held in the routing information setting unit 53. Each of the VPI conversion units $55_1, \ldots 55_n$ contains a VPI conversion table as explained with reference to FIG. 4. According to the present invention, each VPI conversion table contains first and second entries corresponding to all possible values of the incoming VPI. The first entries contain information on the conversions from all possible incoming VPI's to corresponding outgoing VPI's for ATM cells input therein from the input port corresponding to the VPI conversion unit, respectively, and the second entries contain traffic flags indicating whether or not the respective first entries currently contain outgoing VPI's for use for the conversion of virtual path identifiers in the ATM cells containing the users' signals.

The interface units 14 and 13 are respectively provided at the input-side and the output-side of the cross-connecting unit 52. The port input-side interface 14 and the output-side interface 13 each contain a plurality of switches each having two contacts a and b on a first side and one contact c on a second side. The contacts c in the input-side interface 14 are respectively connected to the plurality of input ports of the cross-connecting unit 52, and the plurality of output ports of the cross-connecting unit 52 are respectively connected to the contacts c of the output-side interface 13. The contacts a of the input-side and output-side interfaces 14 and 13 are connected to transmission lines for transmitting ATM cells containing users' signals, and the contacts b are connected to the path examination control unit 30, as explained below. The plurality of switches in the input-side and output-side interfaces 14 and 13 are controlled by the path examination control unit 30.

The path examination control unit 30 contains a CPU 36, a cell input unit 37, a routing information control unit 39, an input-side decoder 138, an output-side decoder 40, a cell examining unit 41, a VPI conversion tables accessing unit 42, and a parameter generating unit 43. The CPU 36 controls the overall operations of the path examination control unit 30. The parameter generating unit 43 generates various parameters (explained later with reference to FIG. 7). The cell input unit 37 generates a plurality of OAM cells (test cells) for monitoring the cross-connecting unit 52 based on the parameters generated in the parameter generating unit 43 to apply to the contacts b of the input-side interface 14. The VPI conversion table access unit 42 accesses the VPI conversion tables in the VPI conversion units $55_1$, ... $55_n$ in the cross-connecting unit 52 based on the above parameters. The routing information control unit 39 rewrites the information held in the routing information setting unit 53 in the cross-connecting unit 52 under the control of the CPU 36. The decoders 138 and 40 respectively decode control signals for controlling the plurality of switches in the input-side and output-side interfaces 14 and 13 to supply decoded signals to the input-side and output-side interfaces 14 and 13.

The plurality of OAM cells which are generated in the cell input unit 37 are input through the input-side interface 14 into the cross-connecting unit 52. The plurality of OAM cells have their virtual path identifiers converted, are then cross-connected in the cross-switch unit 54, and are output from the cross-connecting unit 52 through the output-side interface 13. The cell examining unit 41 examines the normality of the cross-connecting unit 52 by comparing the above OAM cells output from the cross-connecting unit 52, with reference OAM cells for the respective output ports (input ports). The reference OAM cells are a plurality of OAM cells which are expected to be output from the cross-connecting unit 52 through the respective output ports when the cross-connecting unit 52 normally operates inputting the above OAM cells generated in the cell input unit 37. The reference OAM cells are generated for the respective OAM cells input into the cross-connecting unit 52, by the CPU 36 based on the above-mentioned parameters generated in the parameter generating unit 43.

FIGS. 6A and 6B are diagrams illustrating an example timing of an OAM cell input into the cross-connecting unit 52 at a timing between ATM cells of users' signals. At this timing, the test cells (OAM cells) are input into and output from the cross-connecting unit 52 by switching switches in the input and output interfaces 14 and 13 to the side of the path examination control unit 30 under the control of the CPU 36 through the decoders 138 and 40 in the path examination control unit 30 in FIGS. 5A and 5B.

FIG. 7 is a diagram illustrating a detailed construction of the parameter generating unit 43 in the construction of FIGS. 5A and 5B. In FIG. 7, reference numeral 60 denotes a sequencer, 61 denotes a VPI conversion table reading circuit, 62 denotes a state determining circuit, 63 denotes an outgoing VPI rewriting circuit, 64 denotes a header parameter generating circuit, 65 denotes a PN sequence generating circuit, 66 denotes a PN sequence initial value register, 67 denotes an outgoing parameter generating circuit, 68 denotes an OAM cell generating circuit, 69 denotes an outgoing reference rewriting circuit, 70 denotes a first comparison parameter register, 71 denotes a second comparison parameter register, and 72 denotes a reference cell generating circuit.

Every time the content of the routing information setting unit 53 is renewed by the routing information control unit 39 as explained later with reference to Table 1, the sequencer 60 is activated by the CPU 36, to output a renewing signal for renewing the header parameter generating circuit 64 and the PN sequence generating circuit 65, in synchronization with a system clock.

The header parameter generating circuit 64 generates data to be contained in the header area, for example, as explained before with reference to FIG. 1. In particular, the header parameter generating circuit 64 generates and outputs incoming VPI's (for example, one of the values 0 to 4095) for the VPI conversion tables corresponding to all the input ports of the cross-connecting unit 52.

Figure 1:
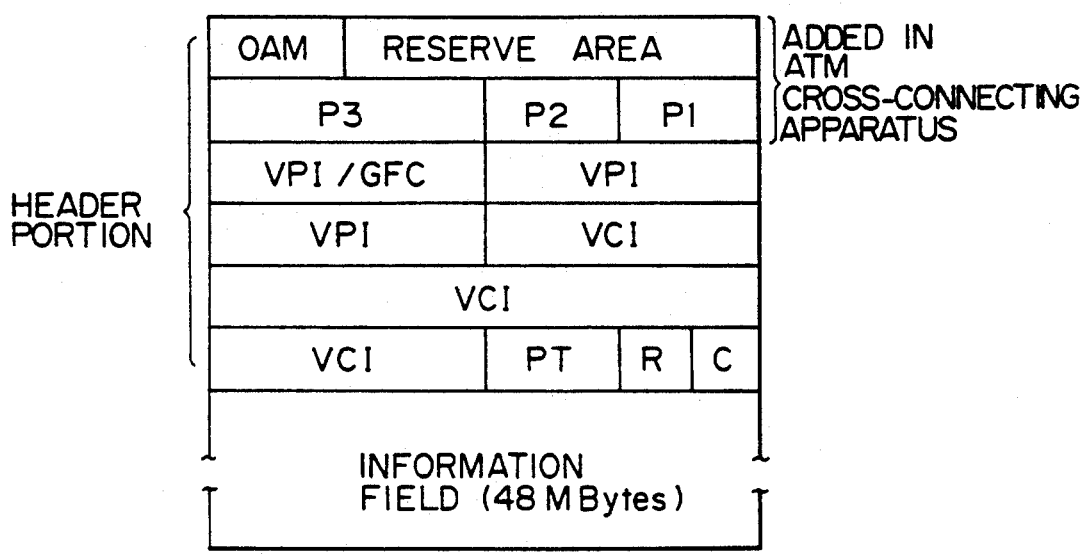
FIG. 1 is a diagram indicating a format of an OAM cell.
Figure 3:
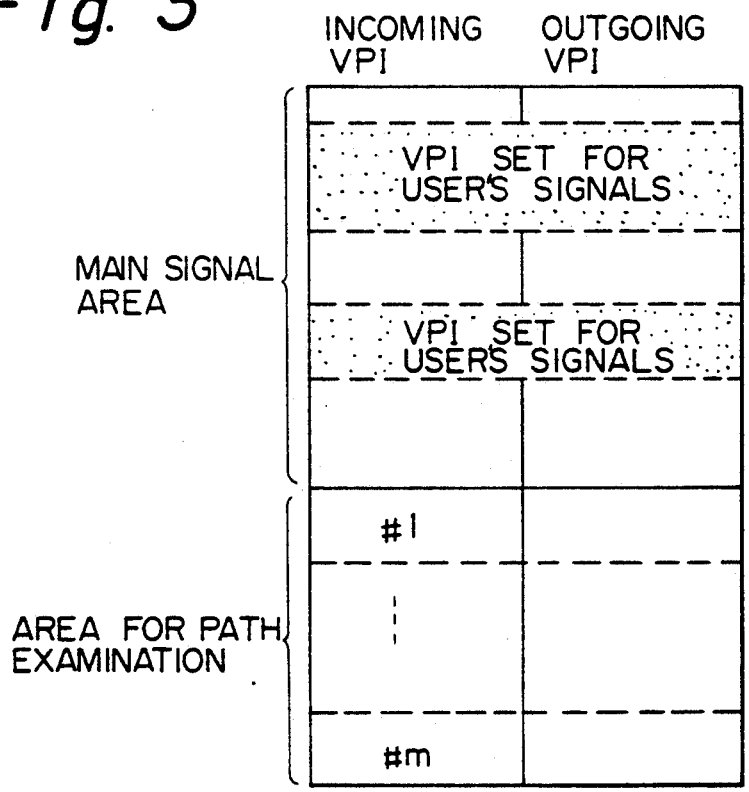
FIG. 3 is a diagram illustrating example contents of a virtual path identifier conversion table.
Figure 2:
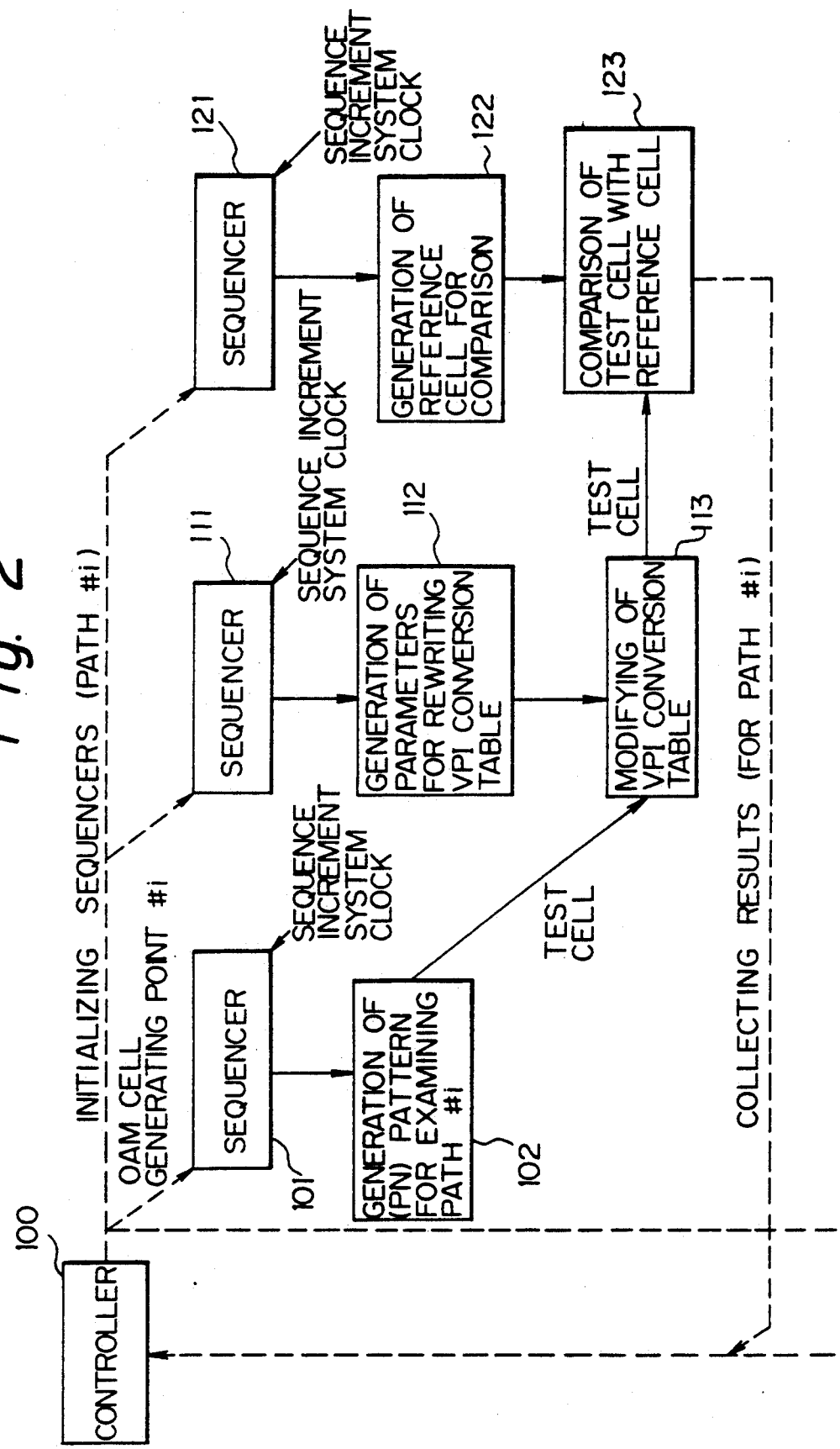
FIG. 2 is a diagram illustrating a sequence of monitoring the normality of an ATM cross-connecting apparatus by inputting an OAM cell for monitoring the operation of the ATM cross-connecting apparatus.

The PN sequence generating circuit 65 generates PN sequences as data to be contained in the information field of the OAM cells for all the input ports, as explained with reference to FIG. 1. The PN sequence generating circuit 65 renews the above PN sequences every time the above renewing signal is received from the sequencer 60. When starting the operation of the monitoring of the cross-connecting unit 52, the CPU 36 sets an initial value for generating the PN sequences, at the PN sequence initial value register 66.

The above data to be contained in the header area and the information field, respectively generated by the header parameter generating circuit 64 and the PN sequence generating circuit 65, is supplied to the OAM cell generating circuit 68, wherein a plurality of OAM cells HP(i) (i=1 to m, m is the number of the input ports of the cross-connecting unit 52) are generated to be input through the m input ports of the cross-connecting unit 52 through the input-side interface 14. In addition, the above data contained in the header area and the information field of the OAM cells, is written in the first and second comparison parameter registers 70 and 71 as reference values to be compared with the contents of the OAM cells output from the plurality of output ports of the cross-connecting unit 52. The comparison reference cell generating circuit 72 generates comparison reference cells containing the above reference values. As explained later, the content of header area parameter comparison data register 70 may be rewritten by the outgoing VPI comparison reference rewriting circuit 69 according to the present invention.

Figure 8:
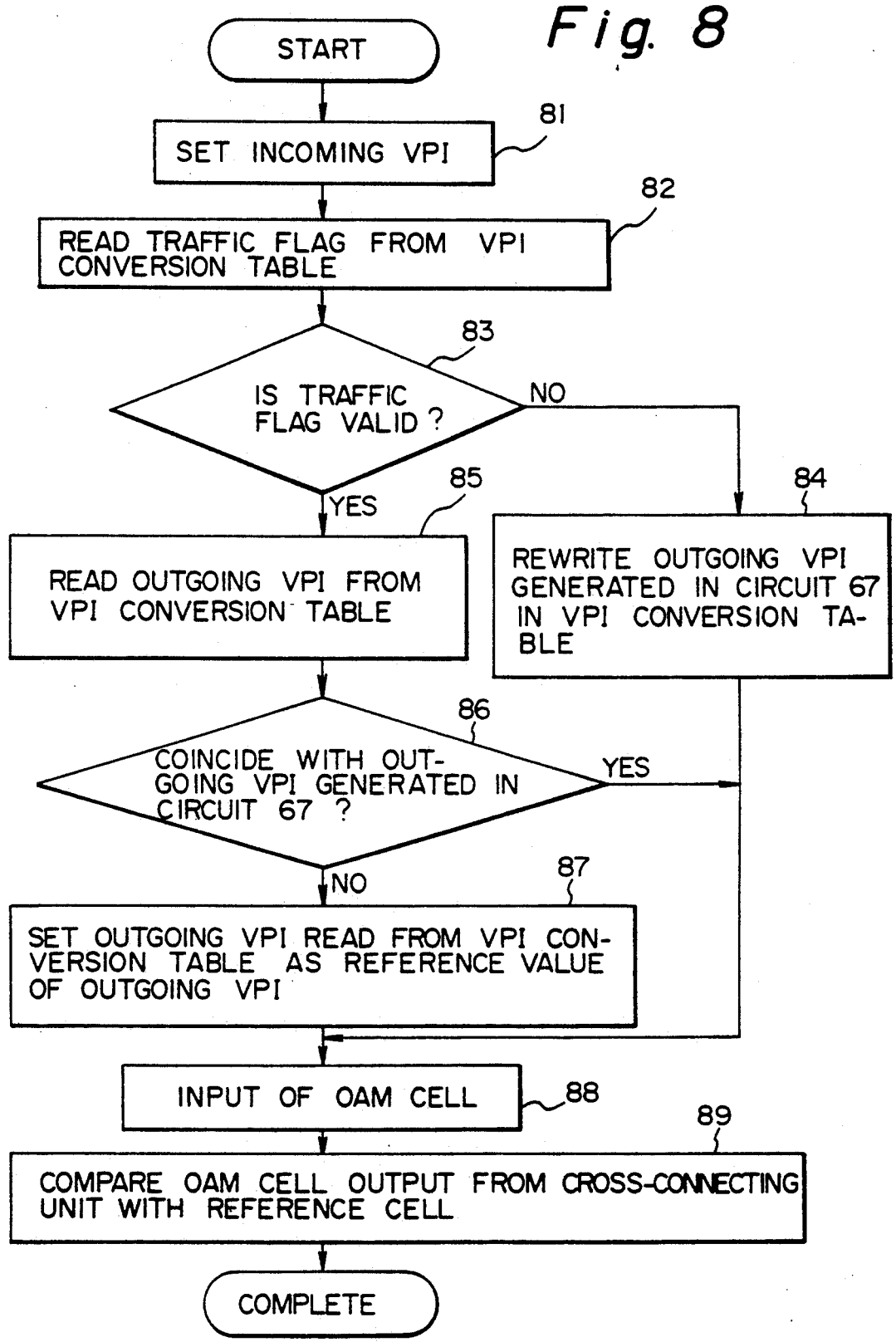
FIG. 8 is a diagram illustrating a process of monitoring the normality of the cross-connecting unit under the control of the state determining circuit 62.

The values of the virtual path identifiers generated by the header parameter generating circuit 64 are also supplied to the VPI conversion table reading circuit 61, and the VPI conversion table reading circuit 61 reads out the traffic flags in the VPI conversion tables, corresponding to the plurality of incoming path directions. The traffic flags are supplied to the state determining circuit 62. When the state determining circuit 62 determines that the traffic flag is not valid (i.e., the first entry corresponding to the incoming VPI in the VPI conversion table is not used for users' signals), the state determining circuit 62 activates the outgoing VPI rewriting circuit 63 to rewrite the corresponding outgoing VPI in the corresponding VPI conversion table in the cross-connecting unit 52. FIG. 8 is a diagram illustrating a process of monitoring the normality of the cross-connecting unit 52 under the control of the state determining circuit 62. The above operation of reading the traffic flag from the VPI conversion table corresponds to step 82 in FIG. 8, and the operation of determining the validity of the traffic flag corresponds to step 83.

The header parameter generating circuit 64 generates and supplies the incoming VPI's to the outgoing parameter generating circuit 67, the outgoing parameter generating circuit 67 generates the outgoing VPI's C(i) corresponding to the above incoming VPI's, where i=1 to m, and i is an index to indicate each input port of the cross-connecting unit 52. The outgoing VPI's C(i) are values respectively expected to be converted from the incoming VPI's in the OAM cells HP(i) input into the cross-connecting unit 52. For an index i for which the state determining circuit 62 determines that the corresponding traffic flag is not valid, the state determining circuit 62 activates the outgoing VPI rewriting circuit 63 to rewrite the value of the outgoing VPI corresponding to the above incoming VPI for the index i, to the outgoing VPI C(i) generated by the outgoing parameter generating circuit 67, in the corresponding VPI conversion table in the cross-connecting unit 52 (step 84 in FIG. 8). Then, the above outputs (the plurality of OAM cells HP(i)) of the OAM cell generating circuit 68 are input into the register 37b in cell input unit 37 indicated in FIG. 9 (step 88 in FIG. 8).

For an index i' for which the corresponding traffic flag read out from the VPI conversion table is determined to be valid, the state determining circuit 62 reads out the outgoing VPI corresponding to the above incoming VPI for the index i', from the VPI conversion table in the cross-connecting unit 52 by the VPI conversion table reading circuit 61 (step 85). Then, the state determining circuit 62 compares the respective values of the outgoing VPI read out as above, with the corresponding values of the outgoing VPI generated by the outgoing parameter generating circuit 67 (step 86). When the value of the outgoing VPI in the VPI conversion table coincides with the corresponding value of the outgoing VPI generated by the outgoing parameter generating circuit 67, the operation goes to step 88 in FIG. 8 to input the corresponding output (the OAM cell HP(i') containing the incoming VPI corresponding to the above outgoing VPI) of the OAM cell generating circuit 68 into the register 37b in cell input unit 37 in FIG. 9. When the value of the outgoing VPI in the VPI conversion table does not coincide with the corresponding value of the outgoing VPI generated by the outgoing parameter generating circuit 67, the state determining circuit 62 activates the outgoing VPI comparison reference rewriting circuit 69 to rewrite the content of the first comparison parameter register 70 with the outgoing VPI read out from the corresponding VPI conversion table (step 87 in FIG. 8). Namely, the reference value of the outgoing VPI, is compulsively rewritten so that the reference value coincides with the outgoing VPI in the VPI conversion table. Then, the operation goes to step 88 in FIG. 8 to input the OAM cell generated by the OAM cell generating circuit 68, into the register 37b in cell input unit 37 in FIG. 9.

Table 1 illustrates correspondences between input ports (OAM cell generating points) and output ports (OAM cell detecting points) in each path examination cycle in the embodiment of the present invention. In Table 1, T1, T2, T3, ... Tm−1, Tm, Tm+1 ... each denote a path examination cycle. As indicated in Table 1, at every path examination cycle, the correspondence between the input ports (OAM cell generating points) and the output ports (OAM cell detecting point) are cyclically shifted.

Figure 9:
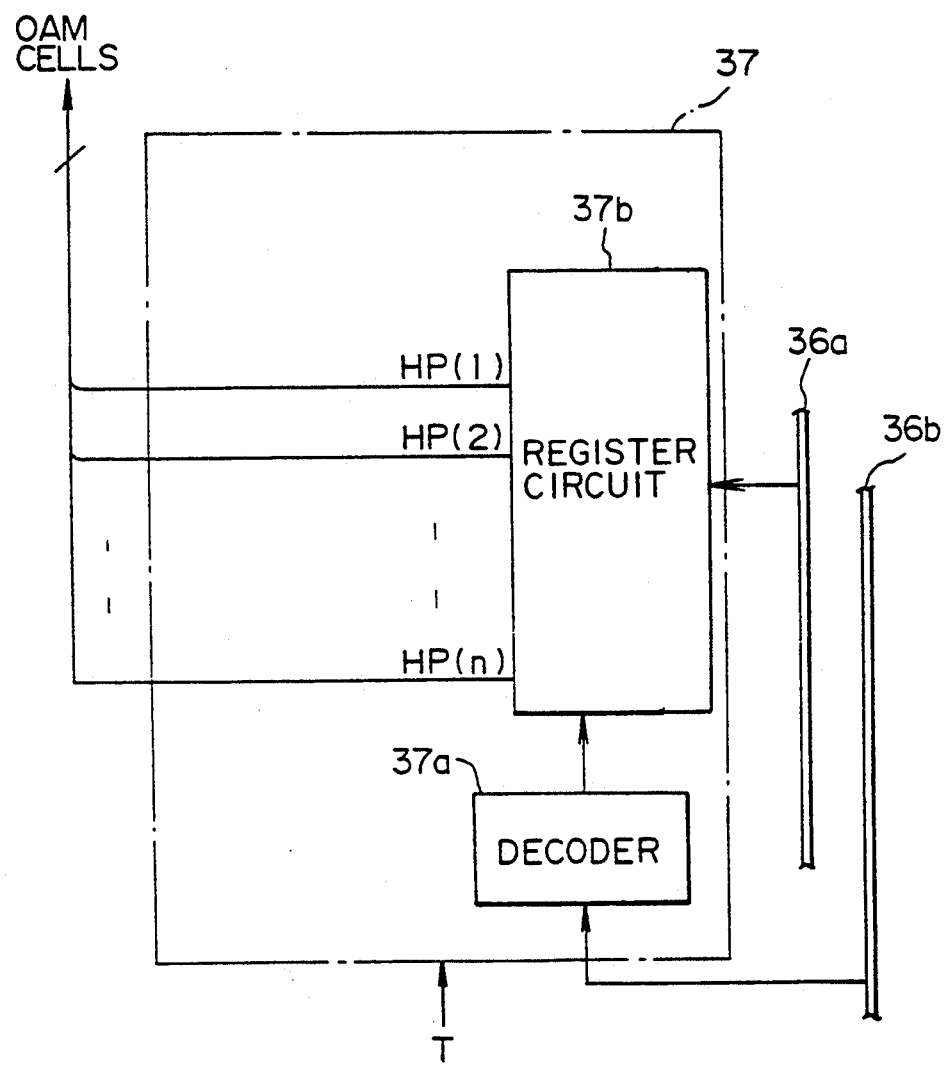
FIG. 9 is a diagram illustrating an example construction of the cell input unit 37 in FIGS. 5A and 5B.

FIG. 9 is a diagram illustrating an example construction of the cell input unit 37 in FIGS. 5A and 5B. In FIG. 9, 37a denotes a decoder, 37b denotes a register, 36a denotes a data bus, and 36b denotes an address bus.

In step 88 of FIG. 8, the outputs of the OAM cell generating circuit 68 are written in turn into corresponding addresses in the register 37b in cell input unit 37 in FIG. 9 through the data bus 36 under the control of the CPU 36. The CPU 36 applies the addresses in the register 37b through the address bus 36b and the decoder 37a to the register 37b. The OAM cells written in the respective addresses in the register 37b are input into the cross-connecting unit 52 through the plurality of input ports of the input-side interface 14 (FIGS. 5A and 5B).

Figure 10:
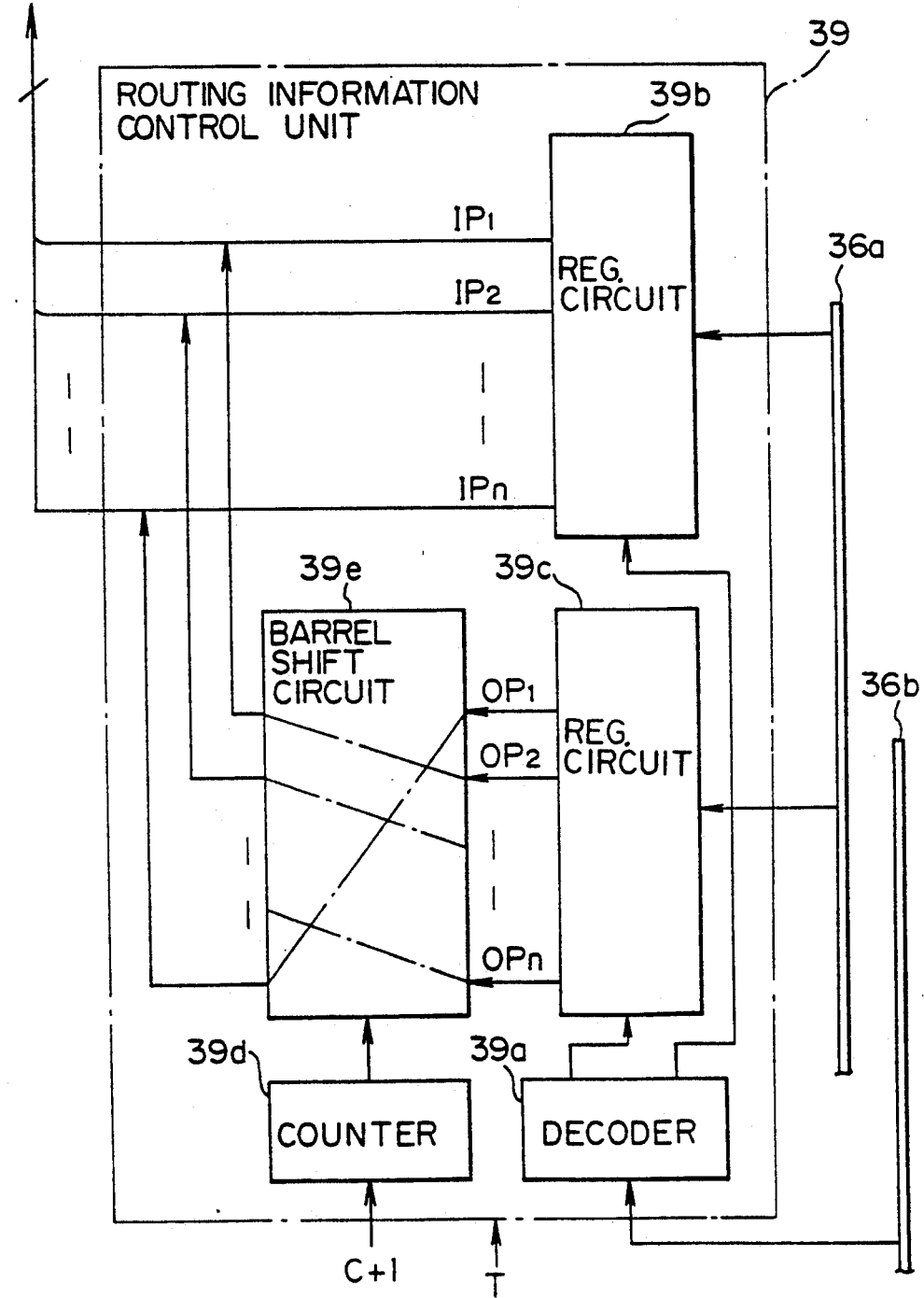
FIG. 10 is a diagram illustrating an example construction of the routing information control unit 39 in FIGS. 5A and 5B.

FIG. 10 is a diagram illustrating an example construction of the routing information control unit 39 in FIGS. 5A and 5B. In FIG. 10, 39a denotes a decoder, 39b and 39c each denote a register, 39e denotes a barrel shift circuit, and 39d denotes a counter.

Data indicating the incoming path directions $IP_1$, $IP_2$, ... $IP_n$ and the outgoing path directions $OP_1$, $OP_2$, ... $OP_n$ are written in the registers 39b and 39c from the CPU 36 through the data bus 36a. At every path examination cycle, a plurality of outputs of the register 39c are cyclically shifted through the barrel shift circuit 39e, as indicated in Table 1. The shifted outputs of the register 39c (the output $OP_j$ (j=1 to m) of the barrel shift circuit 39e), together with the corresponding output $IP_i$ of the register 39b, indicates the connection between the incoming path direction $IP_i$ and outgoing path direction $OP_j$ in the cross-connecting unit 52. Namely, in the case, for example, $(IP_1, IP_2, ... IP_n)=(1, 0, ... 0)$, and $(OP_1, OP_2, ... OP_n)=(1, 0, 0, ... 0, 0)$, the outputs of the barrel shift circuit 39e in the path examination cycle T1 are $(1, 0, 0, ... 0, 0)$, the outputs of the barrel shift circuit 39e in the path examination cycle T2 are $(0, 0, 0, ... 0, 1)$, the outputs of the barrel shift circuit 39e in the path examination cycle T3 are $(0, 0, 0, ... 1, 0), ...$, the outputs of the barrel shift circuit 39e in the path examination cycle Tm-1 are $(0, 0, 1, ... 0, 0)$, the outputs of the barrel shift circuit 39e in the path examination cycle Tm are $(0, 1, 0, ... 0, 0)$, the outputs of the barrel shift circuit 39e in the path examination cycle Tm+1 are $(1, 0, 0, ... 0, 0)$ and so on. When setting the above information on the correspondences (connection) between the input ports and the output ports in the routing information setting unit 53 in the cross-connecting unit 52 at every path examination cycle, the cross-connection between the input ports and the output ports in the cross-connecting unit 52 is changed as indicated in Table 1. The above shifting operations in the barrel shift circuit 39e are controlled by the output of the counter 39d, which is incremented at every path examination cycle. In FIG. 10, c+1 denotes an increment signal supplied from the CPU 36 at every path examination cycle.

Figure 11:
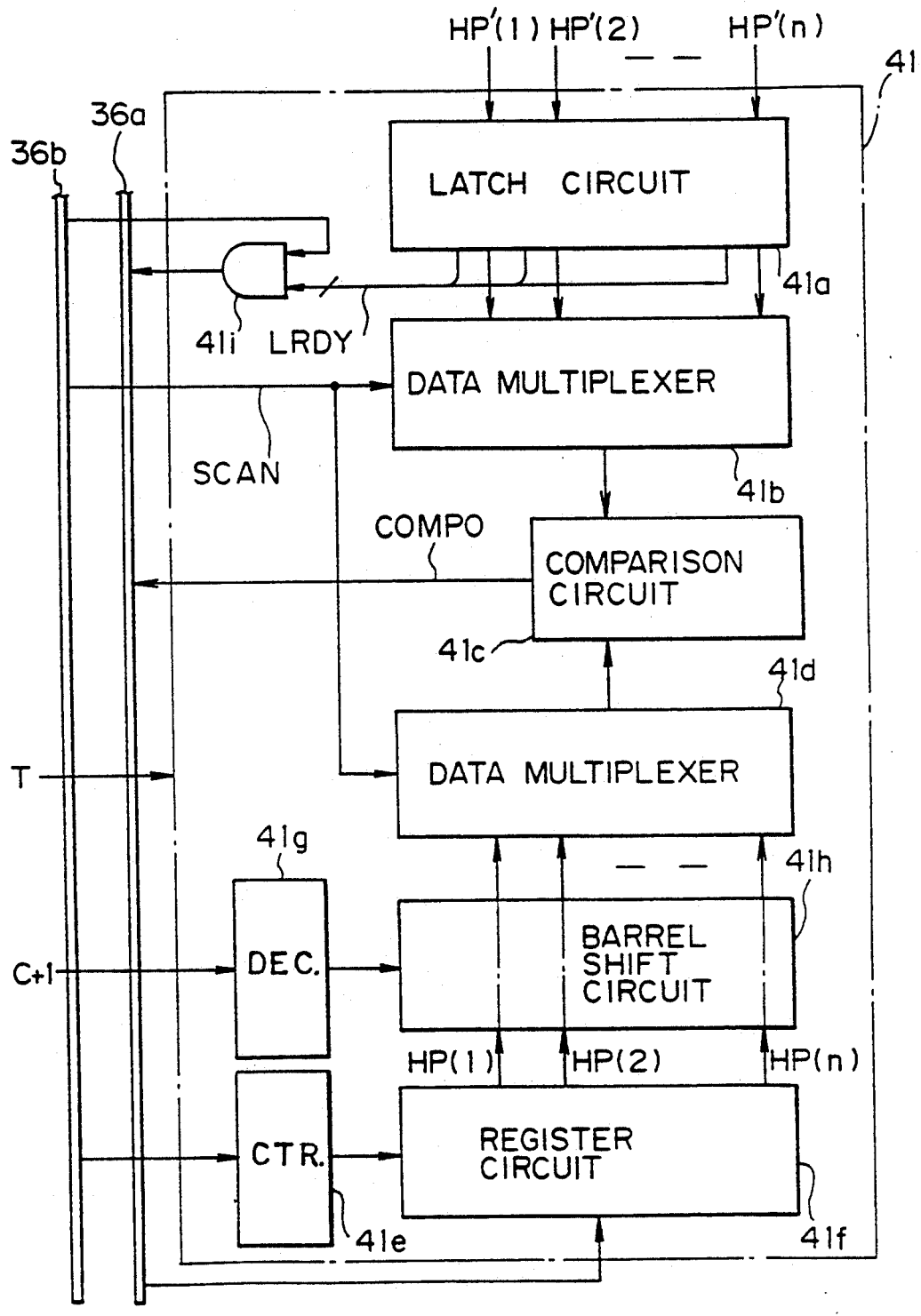
FIG. 11 is a diagram illustrating an example construction of the cell examining unit 41 of FIGS. 5A and 5B.

FIG. 11 is a diagram illustrating an example construction of the cell examining unit 41 of FIGS. 5A and 5B. In FIG. 11, 41a denotes a latch circuit, 41b and 41d each denote a data multiplexer, 41c denotes a comparison circuit, 41e denotes a decoder, 41f denotes a register, 41g denotes a counter, 41h denotes a barrel shift circuit, and 41i denotes an AND gate.

In step 88 in FIG. 8, in addition to the above explained operation, the outputs of the comparison reference cell generating circuit 72 of FIG. 7 are written in turn in the corresponding addresses of the register 41f, respectively, under the control of the CPU 36 through the data bus 36a. In this case, the addresses of the register 41f are applied to the address bus 36b and the decoder 41e under the CPU 36 through the address bus 36b and the decoder 41e. The m outputs of the register 41f are applied parallel to the barrel shift circuit 41h. The barrel shift circuit 41h is controlled by the count of the counter 41g so that the m outputs of the register 41f are shifted in a manner similar to the barrel shift circuit 39e in FIG. 8 in synchronization with the barrel shift circuit 39e. Similar to the counter 39d in FIG. 8, the count of the counter 41g is incremented by the increment signal c+1 supplied from the CPU 36 at every path examination cycle. The outputs of the barrel shift circuit 41h are applied parallel to the data multiplexer 41d, and the data multiplexer 41d selects in turn the respective outputs of the barrel shift circuit 41h, under the control of the CPU 36, to supply the selected values to the comparison circuit 41c as reference values for comparison.

The m outputs HP'(i) (i=1 to m) of the output-side interface 13 are latched in parallel formation in the latch circuit 41a. The parallel outputs of the latch circuit 41a are applied to the data multiplexer 41b, and the data multiplexer 41b selects in turn the outputs of the latch circuit 41a, under the control of the SCAN signal supplied from the CPU 36 to supply the selected values to the comparison circuit 41c as values to be examined. The SCAN signal is sent from the CPU 36 when the CPU 36 recognizes, through the AND gate 41i, the timing at which all of the m outputs of the output interface 13 are latched in the latch circuit 41a.

The outputs of the comparison circuit 41c, each indicating the normality of the operation in a path of an OAM cell in the cross-connecting unit 52 (including the normality of one of the first entries of the VPI conversion table corresponding to the incoming VPI in the incoming OAM cell) are in turn transferred through the data bus 36a to the CPU 36. Thus, the normality of the cross-connecting unit 52 can be monitored for all the input (output) ports.

Figure 12A:
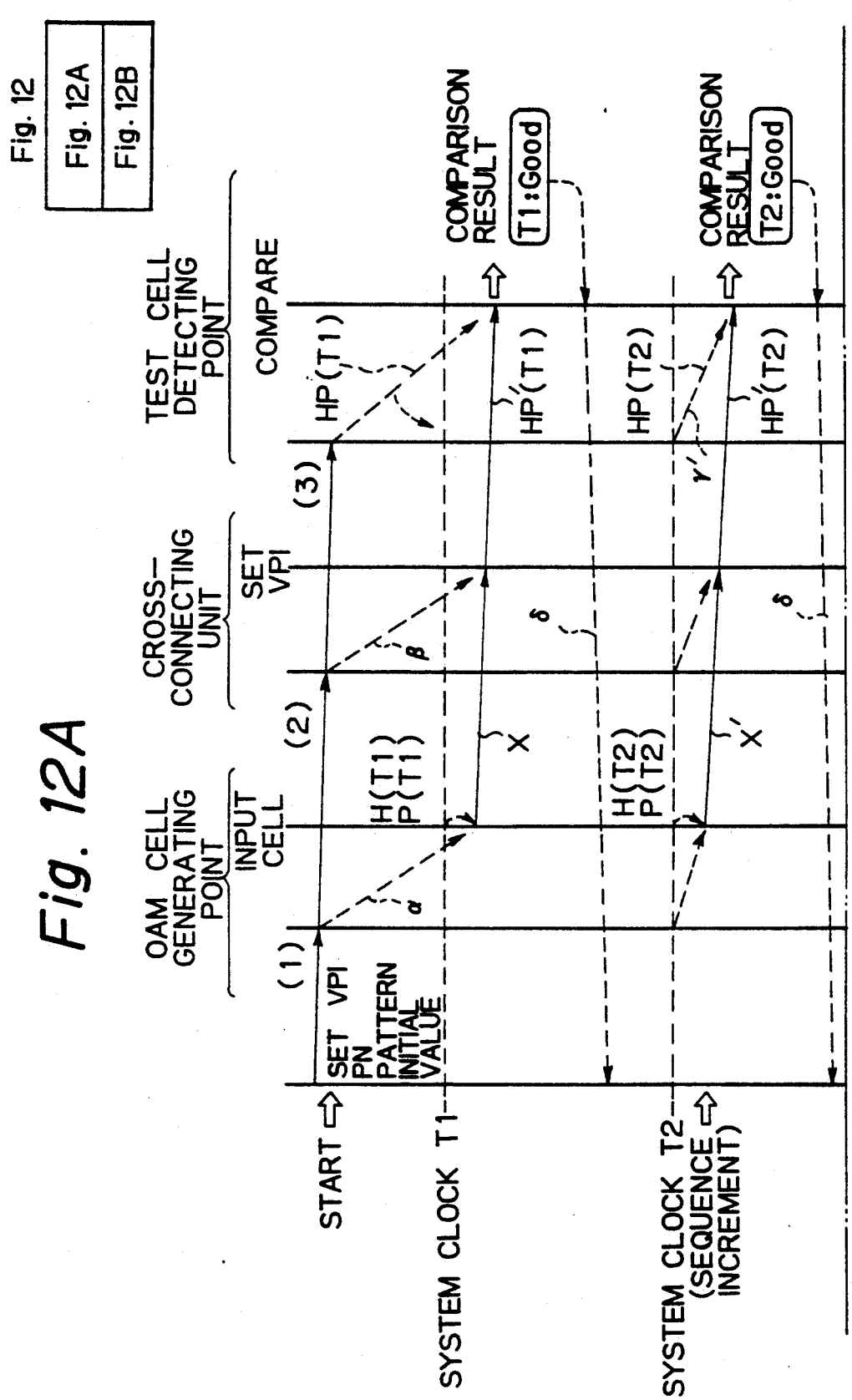
Figure 12B:
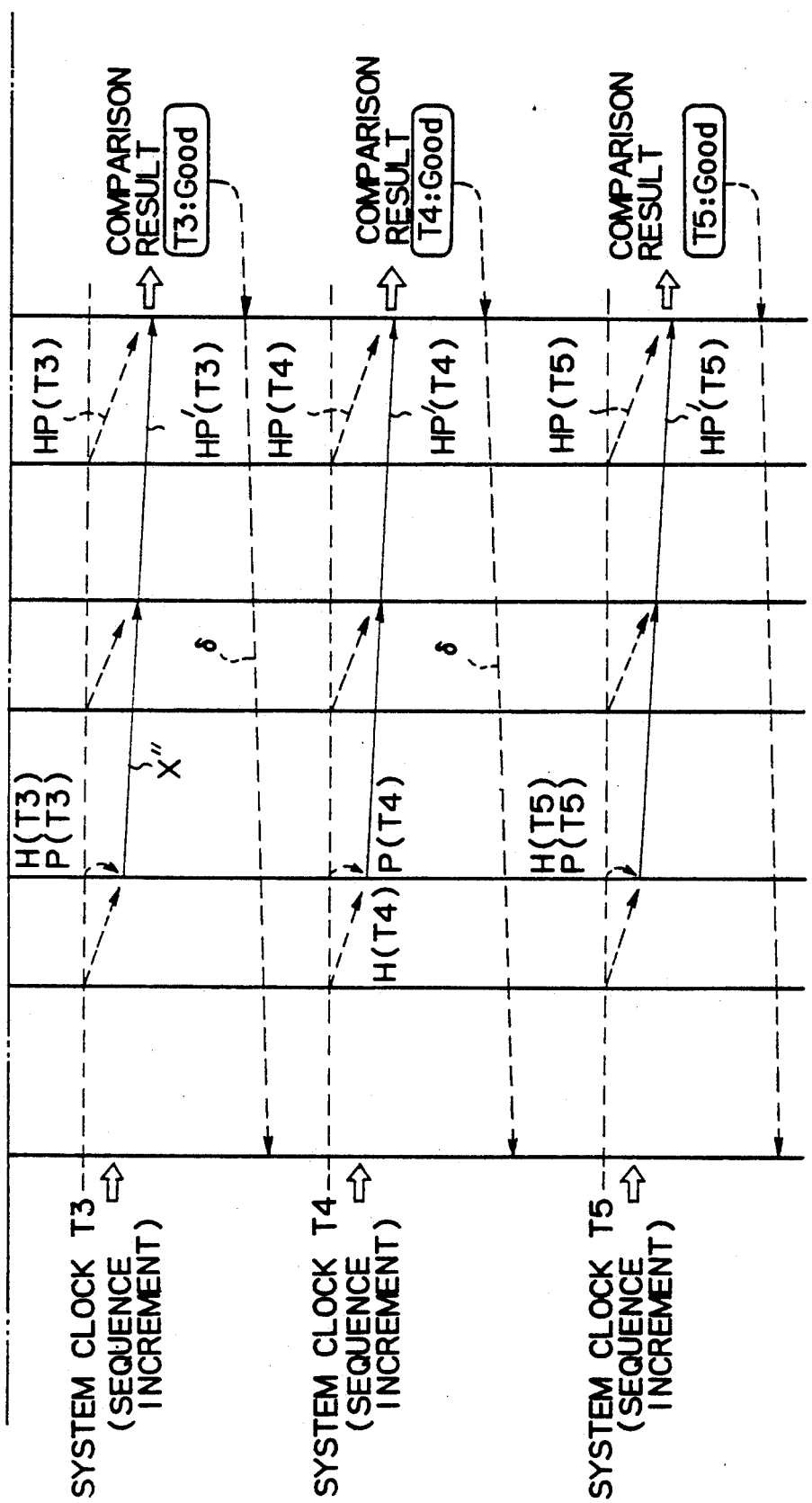

FIG. 12 is a diagram illustrating an overall sequence of monitoring the ATM cross-connecting apparatus according to the present invention. In FIG. 12, (1) denotes an OAM cell generating phase, (2) denotes an examination condition setting phase, and (3) denotes an OAM cell detecting phase. In the OAM cell generating phase (1), the virtual path identifiers in the incoming path directions, the virtual path identifiers in the outgoing path directions, and the initial value of the PN sequence are set in the parameter generating unit 43 of FIGS. 5A and 5B, to generate the OAM cells for monitoring the cross-connecting unit 52 (denoted by $\alpha$). In the examination condition setting phase (2), access to the VPI conversion table, and the setting of the examination condition (the modification of the VPI conversion tables in the cross-connecting unit 52 and the setting of the reference values for comparison) based on the result of the access, are performed (denoted by $\beta$). Then, in the OAM cell detecting phase (3), the comparison reference cells are generated (denoted by $\gamma$). When the OAM cells HP(T1) each containing the header area H(T1) and the information field P(T1) (for monitoring the cross-connecting unit 52) are generated ($\alpha$), the OAM cells are input into the cross-connecting unit 52 through the input-side interface 14 in synchronization with the system clock T1, the OAM cells flows (having their virtual path identifiers converted and being cross-connected) in the cross-connecting unit 52 (denoted by x). The virtual path identifiers in the OAM cells are converted in the cross-connecting unit 52 using the VPI conversion tables modified in the examination condition setting phase ($\beta$), and the OAM cells are cross-connected in the cross-switch unit 54. Then, the OAM cells HP'(T1) are output through the output-side interface 13 so as to be compared with the comparison reference cells generated in the OAM cell detecting phase ($\gamma$). The results of the comparison are transferred to the CPU 36 (denoted by $\delta$).

Then, in synchronization with every system clock T2, T3, . . . , the order of the m comparison reference cells are cyclically shifted ($\gamma'$), and the above comparison and transfer of the comparison results are performed (denoted by $\delta$).

As explained above, according to the present invention, the examination of the entries in the VPI conversion tables currently used for the transmission of the ATM cells containing users' signals becomes possible.

TABLE 1

| Input Ports | Correspondences between Input Ports and Output Ports | | | | | | |
|---|---|---|---|---|---|---|---|
| | Output Ports in Path Examination Cycles | | | | | | |
| | T1 | T2 | T3 | . . . Tm − 1 | Tm | Tm + 1 | . . . |
| #1 | #1 | #2 | #3 | . . . #m − 1 | #m | #1 | . . . |
| #2 | #2 | #3 | #4 | . . . #m | #1 | #2 | . . . |
| #3 | #3 | #4 | #5 | . . . #1 | #2 | #3 | . . . |
| #4 | #4 | #5 | #6 | . . . #2 | #3 | #4 | . . . |
| #5 | #5 | #6 | #7 | . . . #3 | #4 | #5 | . . . |
| . | . | . | . | . . . . | . | . | . . . |
| . | . | . | . | . . . . | . | . | . . . |
| #m − 1 | #m − 1 | #m | #1 | . . . #m − 3 | #m − 2 | #m − 1 | . . . |
| #m | #m | #1 | #2 | . . . #m − 2 | #m − 1 | #m | . . . | i (i = 1 to m) each denotes a test cell.

I claim:

1. An ATM cross-connecting apparatus connecting a plurality of incoming paths and a plurality of outgoing paths, and inputting a plurality of ATM cells from the plurality of incoming paths, comprising:

a cross-connecting unit comprising,
a plurality of input ports respectively connected to the plurality of incoming paths,
a plurality of output ports respectively connected to the plurality of outgoing paths,
switch means for connecting the plurality of incoming paths and the plurality of outgoing paths in accordance with routing information,
VPI conversion means, provided for and connected to each input port, for converting a first virtual path identifier contained in the ATM cell, to a second virtual path identifier for identifying a virtual path in the outgoing path through which the ATM cell is to be transmitted,
VPI conversion table, contained in each VPI conversion means, for having entries containing values of the second virtual path identifier corresponding to all possible values of the first virtual path identifier, and traffic flag means in the VPI conversion table, for containing flag information indicating whether or not each entry currently contains a value of the second virtual path identifier which is used for transmission of an ATM cell containing a user's signal; and a self-testing unit comprising, first virtual path identifier generating means for generating a value of the first virtual path identifier contained in a test cell to be input from each of the plurality of input ports of the cross-connecting unit, second virtual path identifier generating means for generating a value of the second virtual path identifier corresponding to the value of the first virtual path identifier generated by the first virtual path identifier generating means, state-of-table determining means for reading the value of the second virtual path identifier contained in the VPI conversion table, corresponding to the value of the first virtual path identifier, and the flag information corresponding to the value of the first virtual path identifier, and determining whether or not the flag information indicates that the entry currently contains a value of the second virtual path identifier used for transmission of an ATM cell containing a user's signal, and determining whether or not the value of the second virtual path identifier read from the VPI conversion table coincides with the value of the second virtual path identifier generated by the second virtual path identifier generating means, virtual path identifier rewriting means for rewriting the value of the second virtual path identifier corresponding to the value of the first virtual path identifier in the VPI conversion table when the flag information corresponding to the value of the first virtual path identifier does not indicate that the entry currently contains a value of the second virtual path identifier used for transmission of an ATM cell containing a user's signal, reference VPI selecting means for selecting as a reference value, the value of the second virtual path identifier read from the VPI conversion table, when the flag information corresponding to the value of the first virtual path identifier indicates that the entry currently contains a value of the second virtual path identifier used for transmission of an ATM cell containing a user's signal, and the value of the second virtual path identifier read from the VPI conversion table does not coincide with the value of the second virtual path identifier generated by the second virtual path identifier generating means, and said reference VPI selecting means having means for selecting, as the reference value, the value of the second virtual path identifier generated by the second virtual path identifier generating means, when the flag information corresponding to the value of the first virtual path identifier indicates that the entry currently does not contain a value of the second virtual path identifier used for transmission of an ATM cell containing a user's signal, or the value of the second virtual path identifier read from the VPI conversion table coincides with the value of the second virtual path identifier generated by the second virtual path identifier generating means;

test cell input means for generating and inputting the test cell containing the value of the first virtual path identifier generated by the first virtual path identifier generating means, for each of the plurality of input ports, to input the test cell into the input port, and comparing means for comparing the value of the second virtual path identifier contained in the test cell passed through the cross-connecting unit, with said reference value, to determine whether or not the second VPI value in these test cell passed through the cross-connecting unit coincides with the reference value.

2. An ATM cross-connecting apparatus according to claim 1, wherein said switch means comprising routing information holding means for holding said routing information, and said self-testing means comprising, routing information setting means for setting the content held by the routing information holding unit, and output selecting means for selecting one of outputs from the plurality of output ports of the cross-connecting unit corresponding to the change of the routing information, to obtain the test cell to be compared by the comparing means.

3. An ATM cross-connecting apparatus according to claim 2, wherein said test cell input means generates a plurality of test cells for the plurality of input ports, to input the test cells through the plurality of input ports to the cross-connecting unit, in each examination cycle;

said reference VPI selecting means generating a plurality of reference values of the second virtual path identifier to be compared with a plurality of test cells output from the plurality of output ports of the cross-connecting unit, in each examination cycle; and said switch means includes routing information holding means for holding said routing information, said self-testing means comprising, routing information changing means for changing the content held by the routing information holding unit, and output order rearranging means for rearranging the order of the plurality of reference values corresponding to the routing information held in the routing information holding means, so that the order of plurality of reference values coincides with the order of plurality of outputs from the plurality of output ports of the cross-connecting units.

4. An ATM cross-connecting apparatus according to claim 1, wherein said self-testing unit further comprising test cell information generating means for generating information to be contained in said test cell other than said first virtual path identifier, said test cell generated by the test cell input means further contains said information generated by the test cell information generating means, and said comparing means further compares the content of the test cell output from the cross-connecting unit, other than the value of the second virtual path identifier contained in the test cell, with the information generated by the test cell information generating means.

5. An ATM cross-connecting apparatus according to claim 4, wherein said information generated by the test cell information generating means contains a PN sequence.

6. A system for monitoring an ATM cross-connecting apparatus connecting a plurality of incoming paths and a plurality of outgoing paths, and inputting a plurality of ATM cells from the plurality of incoming paths, said ATM cross-connecting apparatus comprising, a plurality of input ports respectively connected to the plurality of incoming paths, a plurality of output ports respectively connected to the plurality of outgoing paths, switch means for connecting the plurality of incoming paths and the plurality of outgoing paths in accordance with routing information, VPI conversion means, provided for and connected to each input port, for converting a first virtual path identifier contained in the ATM cell, to a second virtual path identifier for identifying a virtual path in the outgoing path through which the ATM cell is to be transmitted, VPI conversion table, contained in each VPI conversion means, for having entries containing values of the second virtual path identifier corresponding to all possible values of the first virtual path identifier, and traffic flag means in the VPI conversion table, for containing flag information indicating whether or not each entry currently contains a value of the second virtual path identifier which is used for transmission of an ATM cell containing a user's signal; and said system comprising, first virtual path identifier generating means for generating a value of the first virtual path identifier for being contained in a test cell to be input from each of the plurality of input ports of the ATM cross-connecting apparatus, second virtual path identifier generating means for generating a value of the second virtual path identifier corresponding to the value of the first virtual path identifier generated by the first virtual path identifier generating means, state-of-table determining means for reading the value of the second virtual path identifier contained in the VPI conversion table, corresponding to the value of the first virtual path identifier, and the flag information corresponding to the value of the first virtual path identifier, and determining whether or not the flag information indicates that the entry currently contains a value of the second virtual path identifier used for transmission of an ATM cell containing a user's signal, and determining whether or not the value of the second virtual path identifier read from the VPI conversion table coincides with the value of the second virtual path identifier generated by the second virtual path identifier generating means, virtual path identifier rewriting means for rewriting the value of the second virtual path identifier corresponding to the value of the first virtual path identifier, in the VPI conversion table when the flag information corresponding to the value of the first virtual path identifier does not indicate that the entry currently contains a value of the second virtual path identifier used for transmission of an ATM cell containing a user's signal, reference VPI selecting means for selecting as a reference value, the value of the second virtual path identifier read from the VPI conversion table, when the flag information corresponding to the value of the first virtual path identifier indicates that the entry currently contains a value of the second virtual path identifier used for transmission of an ATM cell containing a user's signal, and the value of the second virtual path identifier read from the VPI conversion table does not coincide with the value of the second virtual path identifier generated by the second virtual path identifier generating means, and said reference VPI selecting means having means for selecting as the reference value, the value of the second virtual path identifier generated by the second virtual path identifier generating means, when the flag information corresponding to the value of the first virtual path identifier indicates that the entry currently does not contain a value of the second virtual path identifier used for transmission of an ATM cell containing a user's signal, or the value of the second virtual path identifier read from the VPI conversion table coincides with the value of the second virtual path identifier generated by the second virtual path identifier generating means;

test cell input means for generating and inputting the test cell containing the value of the first virtual path identifier generated by the first virtual path identifier generating means, for each of the plurality of input ports, to input the test cell into the input port, and comparing means for comparing the value of the first virtual path identifier contained in the test cell passed through the cross-connecting unit, with said reference value, to determine whether or not the second VPI value in these test cell passed through the cross-connecting unit coincides with the reference value.

7. A process for monitoring ATM cross-connecting apparatus connecting a plurality of incoming paths and a plurality of outgoing paths, and inputting a plurality of ATM cells from the plurality of incoming paths, said ATM cross-connecting apparatus comprising, a plurality of input ports respectively connected to the plurality of incoming paths, a plurality of output ports respectively connected to the plurality of outgoing paths, switch means for connecting the plurality of incoming paths and the plurality of outgoing paths in accordance with routing information, VPI conversion means, provided for and connected to each input port, for converting a first virtual path identifier contained in the ATM cell, to a second virtual path identifier for identifying a virtual path in the outgoing path through which the ATM cell is to be transmitted, VPI conversion table, contained in each VPI conversion means, for having entries containing values of the second virtual path identifier corresponding to all possible values of the first virtual path identifier, and traffic flag means in the VPI conversion table, for containing flag information indicating whether or not each entry currently contains a value of the second virtual path identifier which is used for transmission of an ATM cell containing a user's signal; and said process comprising, a first step for determining whether or not the respective traffic flag indicates that the entry of the VPI conversion table corresponding to the traffic flag, currently contains a value of the second virtual path identifier which is used for transmission of an ATM cell containing a user's signal;

a second step for rewriting each entry of the VPI conversion table for examining the VPI conversion table when the traffic flag corresponding to the entry indicates that the entry of the VPI conversion table corresponding to the traffic flag, does not contain a value of the second virtual path identifier which is used for transmission of an ATM cell containing a user's signal a third step for generating and inputting the test cell containing the value of the first virtual path identifier generated by the first virtual path identifier generating means, for each of the plurality of input ports, to input the test cell into the input port; and a fourth step for examining the test cell after the test cell passes through the ATM cross-connecting apparatus, by comparing the value of the second virtual path identifier contained in the test cell passed through the cross-connecting unit.

8. A process according to claim 7, wherein the operation of examining the test cell in the fourth step is carried out by comparing the test cell with a reference cell, said process further comprising, a first additional step for generating the reference cell for each entry of the VPI conversion table so that the reference cell contains the value of the second virtual path identifier which is rewritten in the second step when the traffic flag corresponding to the entry indicates that the entry of the VPI conversion table corresponding to the traffic flag, does not contain a value of the second virtual path identifier which is used for transmission of an ATM cell containing a user's signal, a second additional step for reading the content of each entry of the VPI conversion table when the traffic flag corresponding to the entry indicates that the entry of the VPI conversion table corresponding to the traffic flag, contains a value of the second virtual path identifier which is used for transmission of an ATM cell containing a user's signal, and a third additional step for generating the reference cell for each entry of the VPI conversion table so that the reference cell contains the value of the second virtual path identifier which is read from the entry of the VPI conversion table when the traffic flag corresponding to the entry indicates that the entry of the VPI conversion table corresponding to the traffic flag, contains the value of the second virtual path identifier which is used for transmission of an ATM cell containing a user's signal.

* * * * *

UNITED STATES PATENT AND TRADEMARK OFFICE
CERTIFICATE OF CORRECTION

PATENT NO. : 5,280,469
DATED : January 18, 1994
INVENTOR(S) : Taniguchi et al.

It is certified that error appears in the above-indentified patent and that said Letters Patent is hereby corrected as shown below:

Column 5, line 2, insert --52-- after "unit".

Column 16, line 14, delete "these" and insert --the--.

Column 18, line 39, insert --ATM-- after "the".

Column 18, line 39, insert --apparatus-- after "cross-connecting".

Column 18, line 41, delete "these" and insert --the--.

Signed and Sealed this

Tenth Day of September, 1996

Attest:

BRUCE LEHMAN

*Attesting Officer*   Commissioner of Patents and Trademarks